(12) United States Patent
Einaudi et al.

(10) Patent No.: US 10,203,801 B2
(45) Date of Patent: Feb. 12, 2019

(54) REMOTE CONTROL

(71) Applicant: Caavo Inc, Santa Clara, CA (US)

(72) Inventors: Andrew E. Einaudi, San Francisco, CA (US); Ashish D. Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 0 days.

(21) Appl. No.: 15/398,221

(22) Filed: Jan. 4, 2017

(65) Prior Publication Data

US 2017/0192600 A1 Jul. 6, 2017

Related U.S. Application Data

(60) Provisional application No. 62/275,119, filed on Jan. 5, 2016.

(51) Int. Cl.

| | |
|---|---|
| *G06F 3/044* | (2006.01) |
| *G06F 3/0482* | (2013.01) |
| *H04N 21/4227* | (2011.01) |
| *H04N 21/482* | (2011.01) |
| *G06F 3/041* | (2006.01) |
| *H04B 1/20* | (2006.01) |
| *H04N 21/422* | (2011.01) |
| *H04N 21/41* | (2011.01) |
| *H04N 21/442* | (2011.01) |

(52) U.S. Cl.
CPC ............ *G06F 3/0416* (2013.01); *G06F 3/044* (2013.01); *H04B 1/202* (2013.01); *G06F 2203/0381* (2013.01); *H04N 21/4126* (2013.01); *H04N 21/42208* (2013.01); *H04N 21/42224* (2013.01); *H04N 21/442* (2013.01)

(58) Field of Classification Search
CPC ...... G06F 3/0236; G06F 3/033; G06F 3/0416; G06F 3/044; G06F 3/03547; G06F 3/0482; G06F 3/04842; H04N 5/4403; H04N 5/44543; H04N 21/40; H04N 21/4126; H04N 21/42208; H04N 21/4221; H04N 21/42215; H04N 21/42224; H04N 21/4227; H04N 21/431; H04N 21/4312; H04N 21/442; H04N 21/47217; H04N 21/482; H04N 2005/4408; H04N 2005/4412; H04N 2005/4421; H04N 2005/443; H04N 2005/4432; H04N 2005/44556

See application file for complete search history.

(56) References Cited

U.S. PATENT DOCUMENTS

| | | | | |
|---|---|---|---|---|
| 2005/0078087 | A1* | 4/2005 | Gates | ............... G06F 3/03543 345/163 |
| 2010/0333043 | A1* | 12/2010 | Faris | ............... G06F 3/04883 715/863 |
| 2011/0169667 | A1* | 7/2011 | Rothkopf | ............ G06F 3/03547 341/20 |

(Continued)

*Primary Examiner* — Michael J Eurice
(74) *Attorney, Agent, or Firm* — Fiala & Weaver P.L.L.C.

(57) ABSTRACT

A remote control is described herein that is configured to sense a variety of user input types on a specific button and that can also sense a variety of user input types on a click pad or region/location of the click pad. By utilizing these capabilities, the remote control can provide a very powerful and versatile user interface. Furthermore, the foregoing can be achieved with only a relatively small number of buttons, thus also providing a user interface that is simple, clean and elegant.

20 Claims, 8 Drawing Sheets

(56) References Cited

U.S. PATENT DOCUMENTS

2013/0051752 A1* 2/2013 Allen ................. H04N 5/44543
                                                      386/234
2016/0018980 A1* 1/2016 Iyer .................... G06F 3/04883
                                                      345/173

* cited by examiner

REMOTE CONTROL

CROSS-REFERENCE TO RELATED APPLICATIONS

This application claims priority to U.S. Provisional Patent Application No. 62/275,119, filed Jan. 5, 2016 and entitled "Remote Control," the entirety of which is incorporated by reference herein.

BACKGROUND

Technical Field

The subject matter described herein relates to remote controls. More particularly, the subject matter described herein relates to the detection of different types of user input events applied to elements of a remote control and actions taken in response to the detection of such different types of user input events.

Description of Related Art

Many remote controls have a relatively large number of buttons at least in part because the device(s) controlled thereby provide a wide variety of user-controllable features. However, not all of the features are used at all times or by all users and thus many of these buttons often go unutilized. Yet, to accommodate all of these buttons, the remote control must have a relatively large form factor. Furthermore, having so many buttons on the remote control can be extremely confusing to the user, at least in part because she must hunt among all the different buttons to try and find one that provides the functionality she is looking for.

BRIEF SUMMARY

A remote control is described herein that is configured to sense at least a click input event and a touch input event on a specific button and that is also is configured to sense at least a click input event and a touch input event on a click pad or specific region/location of the click pad. When a click input event is detected, a first command is caused to be executed. When a touch input event is detected, a second command is caused to be executed. By utilizing these capabilities, the remote control can provide a very powerful and versatile user interface. Furthermore, the foregoing can be achieved with only a relatively small number of buttons, thus also providing a user interface that is simple, clean and elegant.

In another aspect, a method for remotely controlling one or more devices and/or a user interface is provided. The method may include detecting a user input event at a user input button or a portion of a user input button of a plurality of user input buttons of a remote control and determining whether the user input event is a click event, a touch event, or another user input event. The method may further include mapping a control command to the user input event based on whether the user input event is a click event or a touch event and on the user input button or the portion of the user input button at which the user input event was detected. For a particular user input button or a particular portion of a user input button at which the user input event was detected, the method includes causing a first control command to be executed in response to determining that the user input event is a click event and causing a second control command to be executed in response to determining that the user input event is a touch event.

In another aspect, a remote control system for remotely controlling one or more devices and/or a user interface is provided. The remote control system includes a remote control that includes a plurality of user input buttons, each of the user input buttons configured to receive a user input event. The remote control system further includes a plurality of sensors, at least one sensor of the plurality of sensors being coupled to one user input button or a portion of a user input button of the plurality of user input buttons, the sensors being configured to generate sensor data in response to a user input event being received at a corresponding user input button or at a corresponding portion of a user input button. Still further, the remote control system includes user input event detection logic configured to receive the sensor data and identify whether the user input event received at the corresponding user input button or the corresponding portion of the user input button was a click event, a touch event, or another user input event. The remote control system also includes command selection logic configured to cause a first control command to be executed in response to determining that the user input event received at the corresponding user input button or the corresponding portion of the user input button was a click event and to cause a second control command to be executed in response to determining that the user input event received at the corresponding user input button or the corresponding portion of the user input button was a touch event.

In another aspect, a remote control for remotely controlling one or more devices and/or a user interface is provided. The remote control includes a plurality of user-actuatable components configured to receive a user input event. Each user-actuatable component including a printed circuit board, a first electrode formed on the printed circuit board, a second electrode formed on the printed circuit board, a metal dome formed on the printed circuit board and positioned between the first electrode and the second electrode, and a flexible overlay formed on the printed circuit board, the first electrode, the second electrode, and the metal dome. The remote control further includes a click pad that includes a plurality of third electrodes and a plurality of fourth electrodes, the third electrodes and the fourth electrodes being disposed alternately in rows and columns to form an array of first and second electrodes. The remote control further includes a plurality of sensing chips, each sensing chip configured to measure a mutual capacitance between a corresponding pair of the first electrodes and the second electrodes and between adjacent pairs of the third electrodes and the fourth electrodes, respectively, the sensing chips being configured to detect a user input event at a corresponding pair of the first electrodes and the second electrodes and/or at a corresponding pair of the third electrodes and the fourth electrodes based on a drop in the mutual capacitance, the user input event comprising at least one of a click event or a touch event, the mutual capacitance falling between an upper threshold value and a lower threshold value in response to a touch event, and the metal dome shorting the corresponding first and second electrodes and/or the corresponding third and fourth electrodes together causing the mutual capacitance to approach zero in response to a click event.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
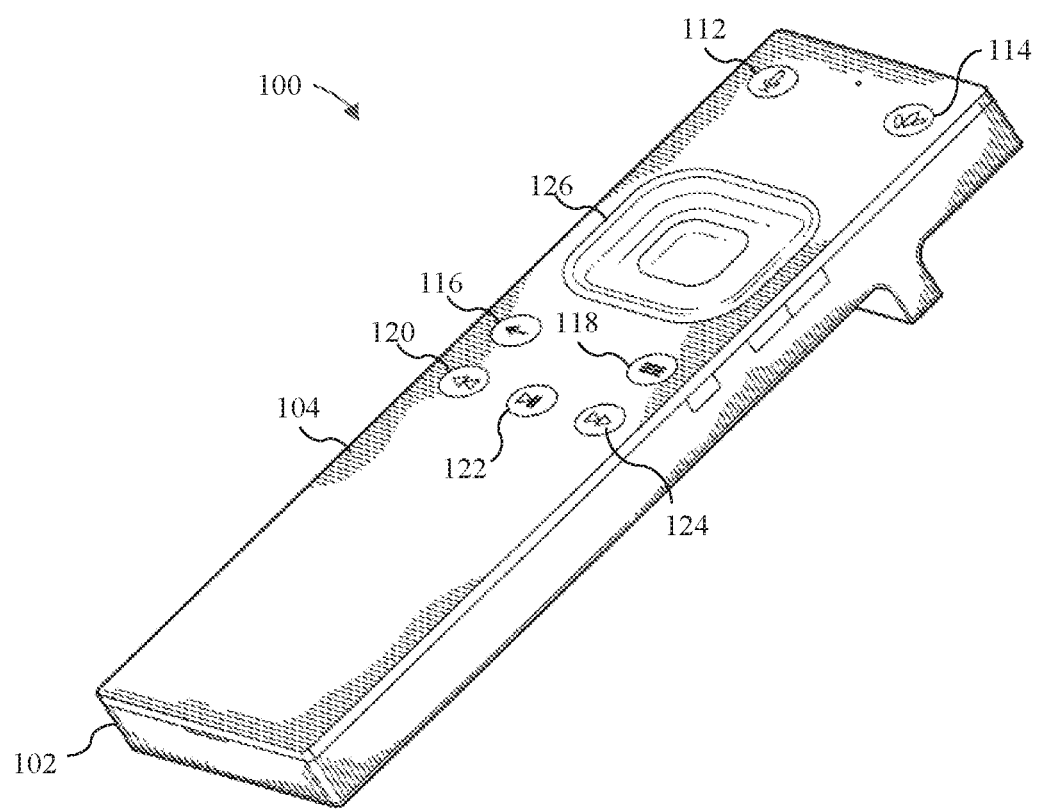
FIG. 1 is a perspective view of an example remote control in accordance with an embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

The example embodiments described herein are provided for illustrative purposes only, and are not limiting. The examples described herein may be adapted to any type of remote control or remote control system. Further structural and operational embodiments, including modifications/alterations, will become apparent to persons skilled in the relevant art(s) from the teachings herein.

A remote control is described herein that is configured to sense a click input event as well as a touch input event on a specific button and that can also sense a click input event as well as a touch input event on a click pad or region/location of the click pad. The remote control is further configured to sense a variety of other user input types that build on a click or a touch, as explained more fully below. By utilizing these capabilities, the remote control can provide a very powerful and versatile user interface. Furthermore, the foregoing can be achieved with only a relatively small number of buttons, thus also providing a user interface that is simple, clean and elegant.

In accordance with one example embodiment, the remote control is capable of identifying and distinguishing between at least the following types of user inputs: (1) touch; (2) rest (a touch that exceeds a certain length of time, but does not cause a click; (3) single click; (4) click and hold; (5) double click; (6) triple click; (7) swipe; and (8) turn/rotate. During operation, the remote control determines which user input happened on which button or at which X/Y coordinate of a click pad, and based on such determination, the remote control can cause a particular control command to be executed. The execution of the command may cause various options to be presented to the user on a screen (e.g., a screen of a device that is currently viewable by the user). When options are presented on a screen, the user can then choose from among the options using the remote control. The foregoing functionality thereby eliminates the need for many buttons on the remote control.

In accordance with a further embodiment, the remote control is configured to enable a user to assign a particular control command to a particular user input event (e.g., button or click pad user input event) on the remote control. In this manner, a user can advantageously customize the remote control's user interface to provide easy access to his or her most often used control commands.

FIG. 1 is a perspective view of an example remote control 100 in accordance with an embodiment. As shown in FIG. 1, remote control 100 comprises a housing 102 that includes a top case 104. Top case 104 includes a plurality of apertures via which a variety of user-actuatable control elements of remote control 100 are exposed to and rendered manipulable by a user. The user-actuatable control elements of remote control 100 include (but are not limited to) a microphone button 112, a home button 114, a back button 116, a menu button 118, a rewind button 120, a play/pause button 122, a fast forward button 124 and a click pad 126.

Each button and region of click pad 126 is capable of receiving at least two basic types of user input. One basic type is a touch and the other basic type is a click. A click occurs when a user presses a button or region of click pad 126 until a mechanical click occurs and then quickly releases the button click (releasing the button click within a predetermined time). A touch occurs when a user merely places a finger on a button or region of click pad 126. In addition to the two basic types of user input, each button and region of click pad 126 may be interacted with to register at least the following types of user input: holding (which may also be referred to as clicking and holding); releasing; tapping; and double tapping. The holding user input is defined as the user pressing the button until a mechanical click occurs and then not releasing the button click (holding the button click for a predetermined amount of time). The releasing user input is defined as the user releasing a button click. The tapping user input is defined as the user placing their finger on the button for a short interval (e.g., less than 200 milliseconds (ms)) without causing a click. Tapping and touch are synonymous. The double tapping user input is defined as the user tapping a button twice in rapid succession (e.g., within 500 ms) without causing a click. These user inputs are described herein by way of example only and are not intended to be limiting. Still other types of user inputs may be identified and distinguished between by a remote control in accordance with further embodiments.

A first example use case scenario for remote control 100 will now be described with continued reference to FIG. 1. The first example use case scenario involves detecting certain user inputs with respect to rewind button 120 and fast forward button 124. In accordance with first example use case scenario, in a certain mode of operation of remote control 100, when a user clicks rewind button 120, this will cause the execution of a rewind command. However, when the user taps (or touches) rewind button 120, this will instead cause the execution of a replay command. Likewise, in this mode of operation, when the user clicks fast forward button 124, this will cause execution of a fast forward command. However, when the user taps (or touches) fast forward button 124, this will cause execution of the skip command. The aforementioned mode of operation may be triggered by the user double tapping on a particular button of remote control 100 or on a particular portion of click pad 126. This mode of operation may also be terminated through further user interaction with remote control 100, or it may be automatically terminated after a predefined amount of time has passed.

Figure 2:
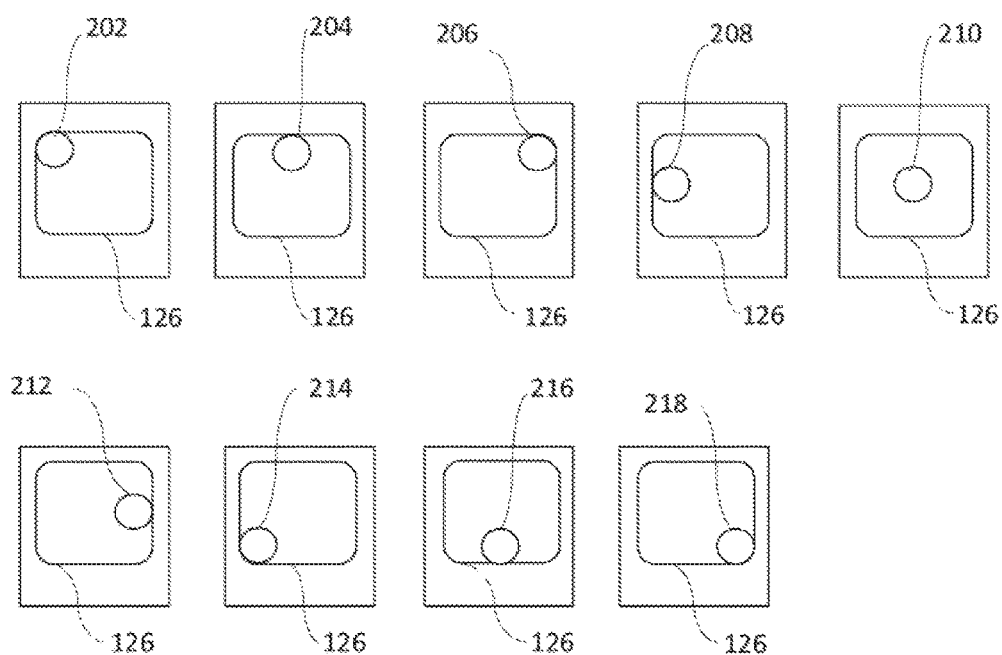
FIG. 2 is a diagram that shows how a unique user input event of the remote control of FIG. 1 may be defined as a combination of one of a plurality of different user inputs or operations and one of nine different regions of a click pad in accordance with an embodiment.

FIG. 2 is a diagram that shows how various unique user input events of remote control 100 may be defined as a combination of one of a plurality of different user inputs or operations and one of nine different regions of a click pad. For example, each one of a click, hold, release, tap (or touch) or double tap user input or operation can be combined with each one of nine regions of click pad 126 (i.e., upper left corner region 202, upper center region 204, upper right corner region 206, center left region 208, center region 210, center right region 212, lower left corner region 214, lower center region 216, lower right corner region 218), thereby producing 45 different identifiable and distinguishable user input events. Each one of these 45 different user input events can advantageously be mapped to a different command or key. It should be noted that in some embodiments, other types of user inputs may be registered as well, thereby producing even more different identifiable and distinguishable user input events.

A second example use case scenario will now be described with respect to FIG. 2. Second example use case scenario involves detecting certain user inputs with respect to click pad 126. When a user clicks on different regions of click pad 126, this will cause the execution of different commands, respectively. Thus, for example, when a user clicks on "up" (region 204), "down" (region 216), "left" (region 208), "right" (region 212) and "OK" (i.e., center region 210) regions of click pad 126, then this will cause the execution of different commands corresponding to each of those regions. Likewise, when a user clicks on different corner regions, i.e., regions 202, 206, 214, and 218, of click pad 126, this will cause the execution of different commands corresponding to each of those regions. In addition, click pad 126 is capable of sensing user input gestures. For example, a user may use her finger to input a gesture or trace a drawing on a surface of click pad 126, wherein the gesture or drawing on click pad 126 comprises a user input event that can be mapped to a different command or key. The different gestures may include tap, double tap, touch and hold, vertical scroll, horizontal scroll, drag flick, flick left, flick right, flick down, flick up, 2x tap, 2x double up, 2x horizontal scroll, 2x vertical scroll, and 2x flick up. However, these are examples only and are not intended to be limiting.

A third example use case scenario will now be described with respect to FIGS. 1 and 2. In the third example use case scenario, remote control 100 may be operating in a mode in which certain user-actuatable elements thereof are used to implement a keypad user interface. With respect to FIGS. 1 and 2, when remote control 100 is in a mode in which it is implementing the keypad user interface, tapping on upper left corner region 202 of click pad 126 will enter a "1," tapping on upper center region 204 of click pad 126 will enter a "2," tapping on upper right corner region 206 of click pad 126 will enter a "3," tapping on center left region 208 of click pad 126 will enter a "4," tapping on center region 210 of click pad 126 will enter a "5," tapping on center right region 212 of click pad 126 will enter a "6," tapping on lower left corner region 214 of click pad 126 will enter a "7," tapping on lower center region 216 of click pad 126 will enter an "8," tapping on lower right corner region 218 of click pad 126 will enter a "9," and tapping on play/pause button 122 will enter a "0." Furthermore, in this mode of operation, when a user double taps on menu button 118, this will cause the currently-entered number to be transmitted to a remote device (e.g., a set-top box), and when the user taps back button 116, this will backspace the number entry. In further accordance with this embodiment, if the user does not double tap menu button 118, then remote control 100 times out and does nothing (e.g., does not transmit the entered number to another device). Although the foregoing scheme utilizes tapping, it is to be appreciated that other types of interaction with click pad 126 and the buttons of remote control 100 may be used to implement such a keypad user interface.

Depending upon the implementation, remote control 100 may be configured such that a keypad user interface thereof is live (i.e. useable) at all times or invoked through a particular user input event or events. For example, the keypad user interface may be invoked by the user resting her finger on the "OK" (i.e. center) region 210 of click pad 126 and then dragging left, although this is merely one example.

Figure 3:
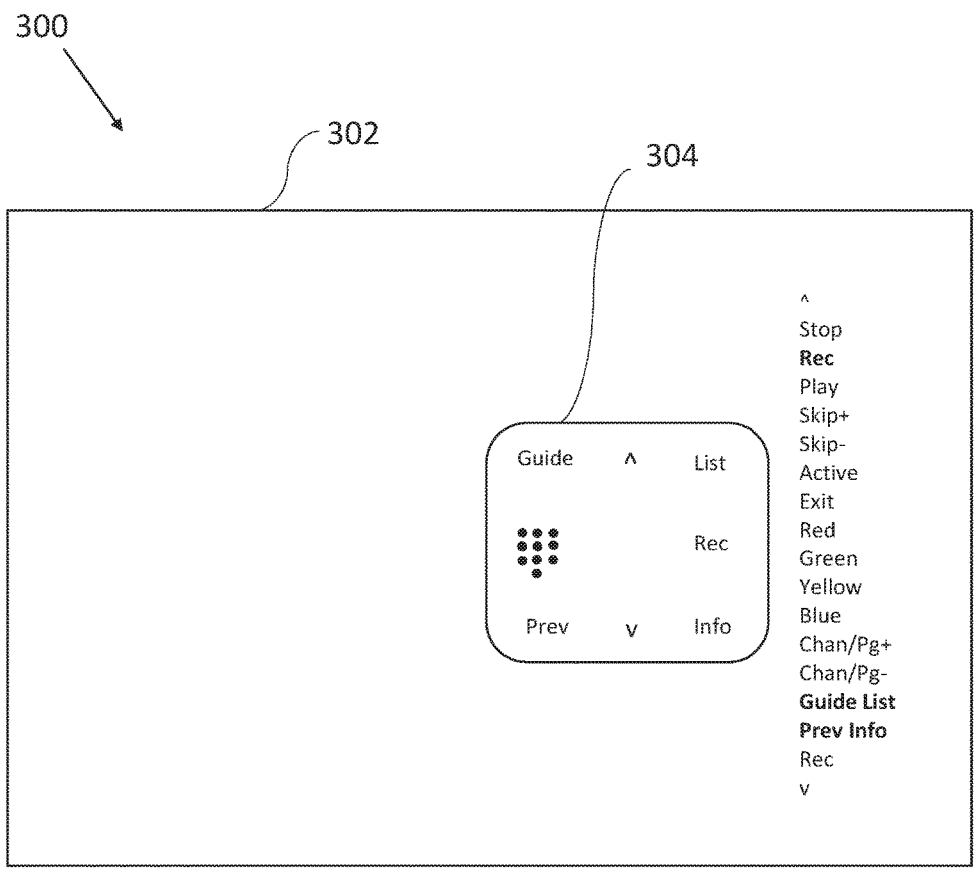
FIG. 3 depicts example use case scenarios for the remote control of FIG. 1 in accordance with an embodiment.

FIG. 3 depicts fourth and fifth example use case scenarios for the remote control of FIG. 1. According to the fourth example use case scenario, as shown in FIG. 3, remote control 100 enables a user to selectively assign certain commands to the corner regions of click pad 126. For example, the user may assign often-used television set-top box commands or keys such as "Guide," "List," "Info," or "Record" to such corner regions of click pad 126. These commands or keys may be referred to as "overflow" commands or keys because they have not been previously assigned to any of the user-actuatable elements of remote control 100. When the user then clicks on or otherwise interacts with any of these corner regions, the command assigned thereto will be executed.

According to the fifth example use case scenario, as further shown in FIG. 3, when a user rests her finger or drags her finger over different portions of click pad 126, this will cause certain functionality or features to be activated or rendered accessible to a user. For example, when a user rests her finger on the "OK" (i.e., center) region 210 of click pad 126, this will have the effect of bringing up a universal remote control interface 304 on a screen 302 of a device that is currently viewable by the user. Universal remote control interface 304 can then be interacted with via remote control 100 to access certain functions or features of remote control 100 (or some other device). For example, when a user drags her finger up and down on click pad 126, this will cause a list of "overflow" commands or keys to be scrolled up and down, respectively, on screen 302. When a user drags her finger right on click pad 126, this will cause a currently-selected "overflow" command or key to be executed. When a user drags her thumb or other finger to a particular corner region of click pad 126, this will cause an "overflow" command or key that is currently assigned to that corner region to be executed. When a user holds a particular corner region of click pad 126, this will cause a currently-selected "overflow" command or key to be assigned to that corner region. In accordance with a further embodiment, when a user drags her finger left on click pad 126, this will cause remote control 100 to implement a keypad user interface such as described with respect to FIG. 2.

Figure 4:
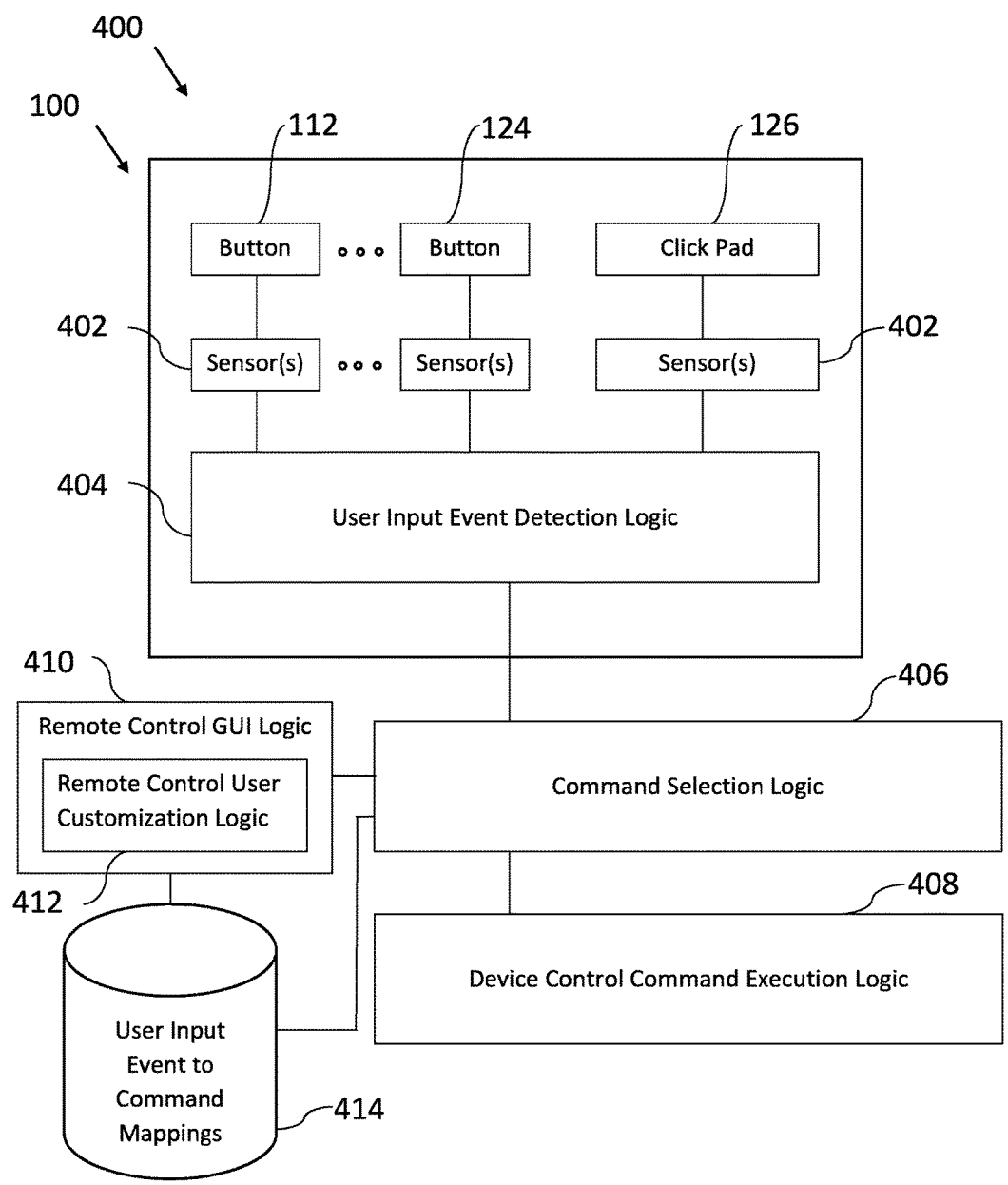
FIG. 4 is a block diagram of an example system for remotely controlling one or more devices and/or a user interface in accordance with an embodiment.

FIG. 4 is a block diagram of an example system 400 for remotely controlling one or more devices and/or a user interface in accordance with an embodiment. As shown in FIG. 4, system 400 includes remote control 100 that includes buttons 112, 124, and click pad 126. Remote control 100 of system 400 includes all of microphone button 112, home button 114, back button 116, menu button 118, rewind button 120, play/pause button 122, and fast forward button 124 shown in FIG. 1, but only buttons 112 and 124 are shown in FIG. 4 for ease of illustration. The remaining description directed to buttons 112 and 124 applies equally to all of the buttons shown in FIG. 1. Remote control 100 also includes, for each button 112, 124, and click pad 126, one or more corresponding sensor(s) 402 that are configured to generate sensor data whenever a user interacts with such button 112, 124 or click pad 126 (or a particular region or location of click pad 126).

As further shown in FIG. 4, remote control 100 includes user input event detection logic 404. User input event detection logic 404 is configured to receive data from sensors 402. Based on such sensor data, user input event detection logic 404 is capable of identifying different types of user inputs occurring at each of buttons 112, 124, and click pad 126. These user inputs may include, for example and without limitation, clicking, holding, releasing, tapping (or touching), double tapping, and resting. Based on such sensor data, user input event detection logic 404 is also capable of identifying such user inputs with respect to one or more regions or locations of click pad 126, and may further be able to identify gestures (e.g., dragging or scrolling, drag flicking, flicking, 2x up or scroll and 2x flick, etc.), symbols and drawings with respect to click pad 126.

User input event detection logic 404 is able to register a distinct user input event based on a combination of a user-actuatable element (button 112, 124, click pad 126, or click pad region or location such as shown in FIG. 2) and a user input applied to that element. Since there are many user input types that can be applied to each type of user-actuatable element, a wide variety of different user input events may be detected by user input event detection logic 404. When a user input event is detected by user input event detection logic 404, information about that user input event is transmitted to command selection logic 406.

Command selection logic 406 may comprise part of remote control 100 or may comprise part of a device (e.g., a set-top box, television, gaming console, receiver, switch, etc.) to which remote control 100 is communicatively connected. In accordance with such an embodiment, information about the detected user input events may be passed from remote control 100 to the external device having command selection logic 406 therein. In either case, command selection logic 406 is configured to map or translate each user input event about which information is received from user input event detection logic 404 into an executable command. To perform this mapping/translation, command selection logic 406 may access a database of user input event to command mappings 414 as shown in FIG. 4.

The executable command to which the user input event is mapped may comprise, for example, a command directed to a graphical user interface (GUI) associated with remote control 100 (denoted "remote control GUI" in FIG. 4). If the command is directed to the graphical user interface (GUI) associated with remote control 100, then command selection logic 406 passes the command to remote control GUI logic 410. Depending upon the implementation, remote control GUI logic 410 may render the remote control GUI to a screen of a device viewable by the user of remote control 100 as an overlay as shown in FIG. 3, or to a screen of remote control 100 itself Thus, for example, the command may be a command to navigate through various menus or screens of remote control GUI, or to activate control features and/or customize control features of remote control 100 via such menus or screens as shown with respect to FIG. 3.

The executable command to which the user input event is mapped may also comprise, for example, a command for remotely controlling a controlled device. If the command is directed to a controlled device, then command selection logic 406 passes the command to device control command execution logic 408, which executes the command to control the controlled device. Depending upon the implementation, device control command execution logic 408 may reside in the controlled device or in an intermediate (e.g., proxy) device.

As further shown in FIG. 4, remote control GUI logic 410 includes remote control user customization logic 412. Remote control user customization logic 412 advantageously enables the user to selectively map different commands to different user input events that may be detected by the remote control. The user may achieve such mapping, for example, by using remote control 100 to interact with the remote control GUI in the manner described above. Any user-created mappings may be stored in database of user input event to command mappings 414 for future reference by command selection logic 406.

Figure 5:
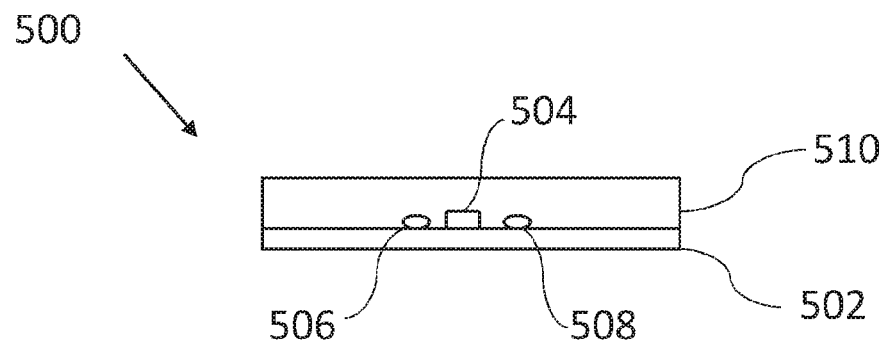
FIG. 5 shows a perspective view of a user-actuatable element in accordance with an embodiment.
Figure 6:
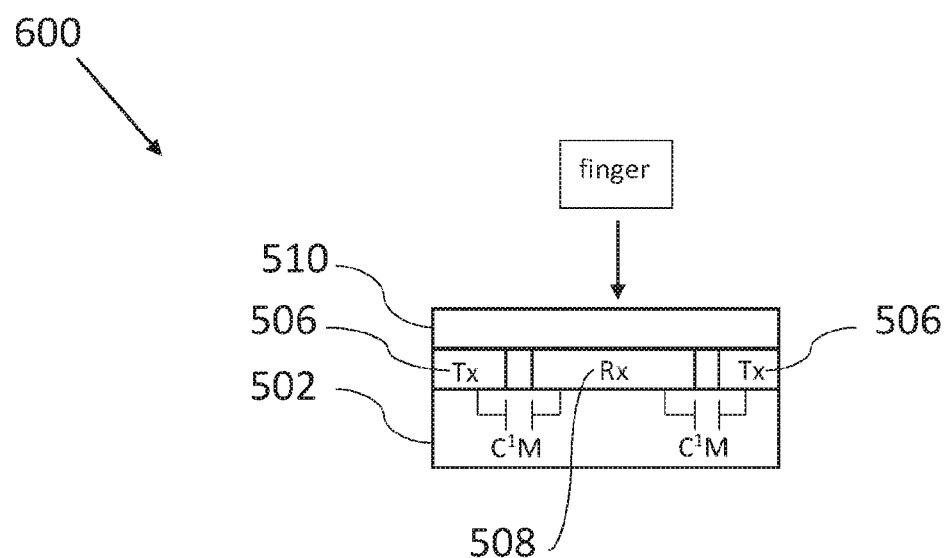
FIG. 6 shows a cross-sectional view of a portion of the user-actuatable element of FIG. 5 in accordance with an embodiment.

FIG. 5 shows a perspective view of user-actuatable element 500 in accordance with an embodiment. User-actuatable element 500 may be any of microphone button 112, home button 114, back button 116, menu button 118, rewind button 120, play/pause button 122, fast forward button 124 or any region of click pad 126 of remote control 100. User-actuatable element 500 is capable of detecting multiple types of user inputs. Although user-actuatable element 500 is capable of detecting multiple types of user inputs, the remaining description of FIG. 5 focuses on distinguishing between a click input event and a touch input event, since the click input and the touch input are the building blocks for all other types of user inputs described herein. FIG. 6 shows a cross-sectional view of a portion of user-actuatable element 500 of FIG. 5 in accordance with an embodiment.

User-actuatable element 500 will now be described with respect to FIGS. 5 and 6. As shown in FIGS. 5 and 6, user-actuatable element 500 includes a controller PCB 502, a metal dome 504, a transmit (Tx) electrode 506 (two transmit Tx electrodes 506 are shown in FIG. 6), a receive (Rx) electrode 508 and a flexible overlay 510. Flexible overlay 510 may be formed of any non-conducting material. In one embodiment, Tx electrode(s) 506 and Rx electrode 508 serve as sensors 402 shown in FIG. 4. User-actuatable element 500 operates using a mutual capacitance sense method. Mutual-capacitance sensing measures the capacitance between Tx electrode(s) 506 and Rx electrode 508. Independently, the capacitance between Tx electrode(s) 506 and Rx electrode 408 is the parasitic capacitance (CP) of the system.

Although not shown in FIG. 5, PCB 502 includes a chip that measures the capacitance between Tx electrode(s) 506 and Rx electrode 508. In a mutual-capacitance measurement system, a digital voltage is applied to a pin (not shown) connected to the Tx electrode(s) 506 and the amount of charge received on Rx electrode 508 is measured. The amount of charge received on Rx electrode 508 is directly proportional to the mutual capacitance (CM) between Tx electrode(s) 506 and Rx electrode 508. When a finger is placed on flexible overlay 510 between Tx electrode(s) 506 and Rx electrode 508, the finger obstructs the charge received on Rx electrode 508 and the mutual-capacitance decreases to $C^1M$, as shown in FIG. 6. This decrease in mutual capacitance indicates that a touch input event has occurred. In addition, in some embodiments, the reduced charge received on Rx electrode 508 may also be detected as touch.

When a user clicks user-actuatable element 500 of FIG. 5, metal dome 504 is depressed and shorts Tx electrode 506 and Rx electrode 508 together, driving the mutual capacitance between Tx electrode 506 and Rx electrode 508 close to zero. Detection of a near zero mutual capacitance between Tx electrode 506 and Rx electrode 508 indicates that a click event has occurred.

To summarize, the mutual capacitance CM between Tx electrode 506 and Rx electrode 508 decreases below the parasitic capacitance CP when a finger is placed on user-actuatable element 500, i.e., when a touch event occurs. Mutual capacitance CM decreases even further to nearly zero when a user clicks user-actuatable element 500 causing metal dome 504 to short Tx electrode 506 and Rx electrode 508 together, i.e., when a click event occurs. For this reason, in some embodiments, an upper and lower threshold of capacitance are determined between which it is safe to assume that a touch event has occurred, but not a click event. The upper threshold level would be below the parasitic capacitance and the lower threshold level would be above what persons skilled in the relevant art(s) would consider to be "approaching zero." A touch event is detected when the mutual-capacitance falls between the lower threshold level and the upper threshold level. A click event is detected when the mutual capacitance approaches zero.

Figure 7:
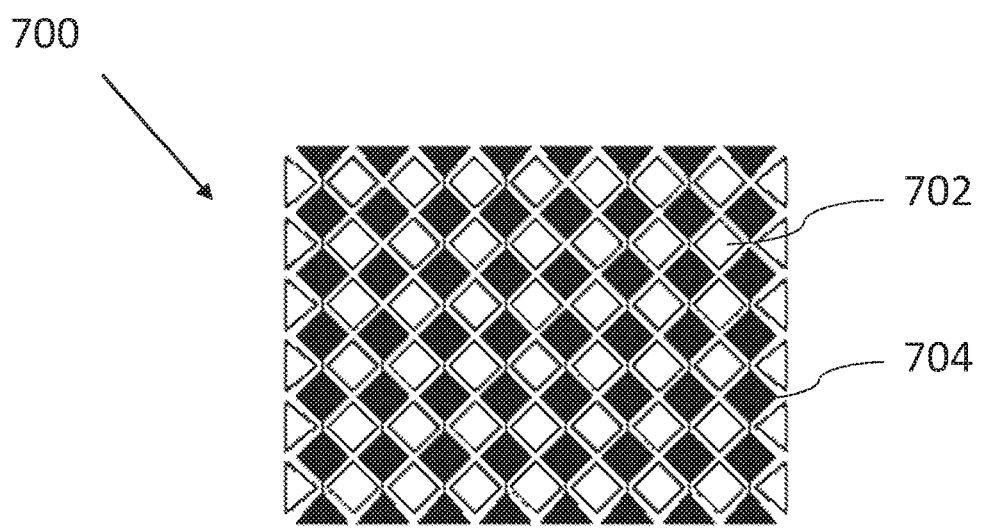
FIG. 7 shows a top view of a construction of a click pad of a remote control in accordance with an embodiment.

FIG. 7 shows a top view of a construction of a click pad 700 of a remote control in accordance with an embodiment. The remote control may be remote control 100 of FIG. 1, and click pad 700 may be click pad 126 of FIG. 1. FIG. 7 shows an array of white elements 702 and black elements 704. White elements 702 and black elements 704 represent multiple Tx electrodes 506 and Rx electrodes 508 of FIG. 5 arranged in columns and rows. Click pad 700 can be viewed as two linear sliders arranged in an X and Y pattern. The array of Tx and Rx electrodes of click pad 700 allows a finger of a user to be detected at any position of click pad 700 in both X and Y dimensions using the same mutual-capacitance sensing method described above. Thus, click pad 700 is able to detect user input gestures such as a swipe, a swipe with two fingers, a drawing, a flick, to name just a few.

Although not shown in FIG. 7, click pad 700 further includes metal domes, such as metal dome 504 of FIG. 5, located at certain X-Y coordinates of click pad 700. For example, in a non-limiting embodiment, metal domes are positioned at each of the nine regions of click pad 126 shown in FIG. 2. Thus, click pad 700 and sensors associated therewith can detect a click event occurring at each of the nine regions, or anywhere a metal dome is placed in the electrode array of click pad 700. A click may be determined at each of the metal domes using the same mutual-capacitance sensing method described above.

Figure 8:
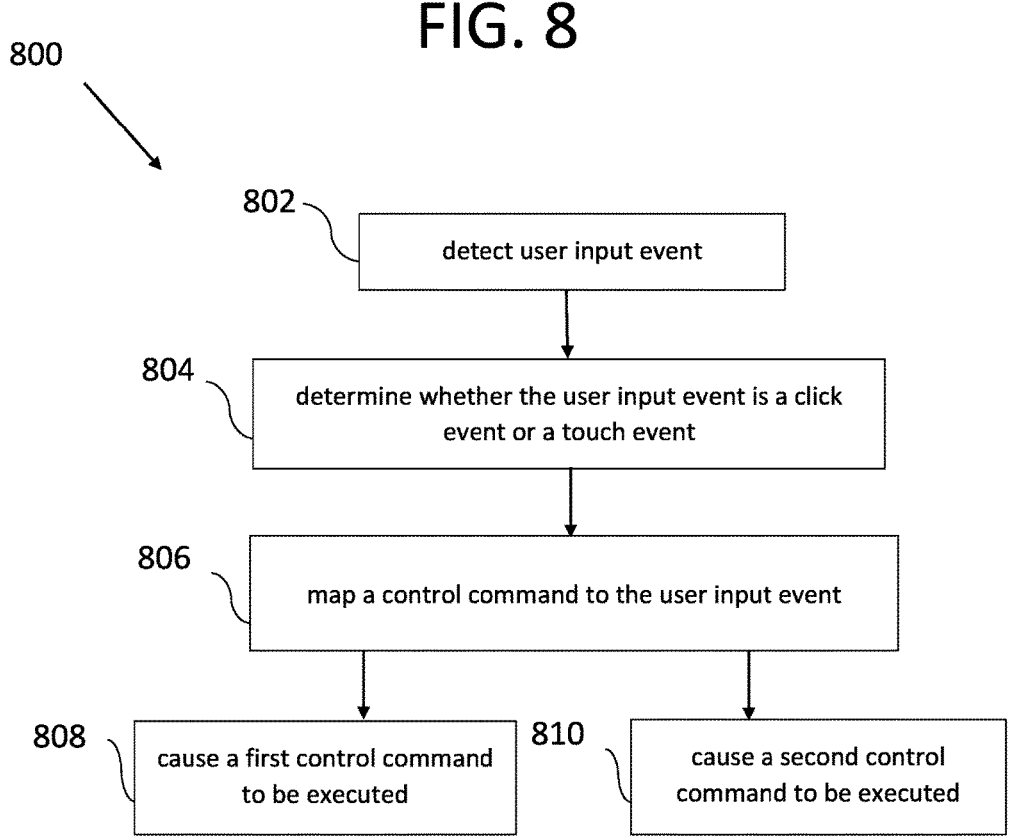
FIG. 8 depicts a flowchart of a method for remotely controlling one or more devices and/or a user interface in accordance with an embodiment.

FIG. 8 depicts a flowchart 800 of a method for remotely controlling one or more devices and/or a user interface in accordance with an embodiment. The steps of flowchart 800 may be performed, for example, by components of system 400. However, the method is not limited to that embodiment.

As shown in FIG. 8, the method of flowchart 800 begins at step 802, in which a user input event is detected in response to a user interaction with a user-actuatable component of a remote control. This step may be performed, for example, by user input event detection logic 404 of system 400.

In the non-limiting embodiment of FIG. 8, at step 804, it is determined whether the user input event is a click event or a touch event. However, other types of user input events may also be determined. The user input event may be identified as a combination of a user input (e.g., clicking, holding, releasing, tapping (or touching), double tapping, resting, a gesture (e.g., dragging or scrolling, drag flicking, flicking, 2x up or scroll and 2x flick, etc.), a symbol or a drawing) and a particular user-actuatable component (e.g., button, click pad, or click pad region or X/Y position or location). The user input event may be identified based on sensor data generated by one or more sensors, such as sensors 402 of FIG. 4, associated with one or more of the user-actuatable components or a portion thereof.

At step 806, a control command from a set of control commands is mapped to the user input event based on whether the user input event is a click event or a touch event and on the user-actuatable component or the portion of the user-actuatable component at which the user input event was detected. This step may be performed, for example, by command selection logic 406 of system 400. Performing this step may include, for example, mapping the detected user input event to the control command in the set of control commands based on a database of user input event to command mappings such as database of user input event to command mappings 414 of FIG. 4. The command that is selected may comprise a command for controlling a GUI, such as the remote control GUI of FIG. 4. The command that is selected may also comprise a command for controlling a device, such as a controlled device.

If it is determined at step 804 that the user input event is a click event, then, after performance of step 806, flow proceeds to step 808 in which a first control command is caused to be executed. If it is determined at step 804 that the user input event is a touch event, then, after performance of step 806, flow proceeds to step 810 in which a second control command is caused to be executed. Steps 808 and 810 may be performed, for example, by remote control GUI logic 410 of system 400 which executes the selected command to facilitate a user interaction with the remote control GUI or a feature accessible via the remote control GUI. Steps 808 and 810 may also be performed, for example, by device control command execution logic 408 of system 400 which executes the selected command to control a controlled device.

To reiterate, a user input event is received at a button or a region of a click pad of a remote control. Sensors associated with the buttons and with regions of the click pad provide sensor data indicating a particular button or region of the click pad at which the user input was received, as well as a type of user input received, e.g., a click event or a touch event. For each particular button or region of the click pad, a unique control command is assigned for each type of user input, e.g., a first control command is assigned to a click event for a particular button or region of the click pad while a second control command is assigned to a touch event for the same particular button or region of the click pad. Since multiple types of user inputs may be received and identified, each particular button and region of the click pad may be assigned to perform multiple control commands, dependent on the type of user input received. As previously mentioned, such a configuration provides for a multitude of functions using a minimum of user input buttons.

III. Example Computer System Implementation

Various components described above may be implemented in hardware, or any combination of hardware with software and/or firmware. For example, various components of remote control 100 and system 400 may be implemented as computer program code configured to be executed in one or more processors. In another example, various components of remote control 100 and system 400 may be implemented as hardware (e.g., hardware logic/electrical circuitry), or any combination of hardware with software (computer program code configured to be executed in one or more processors or processing devices) and/or firmware.

Figure 9:
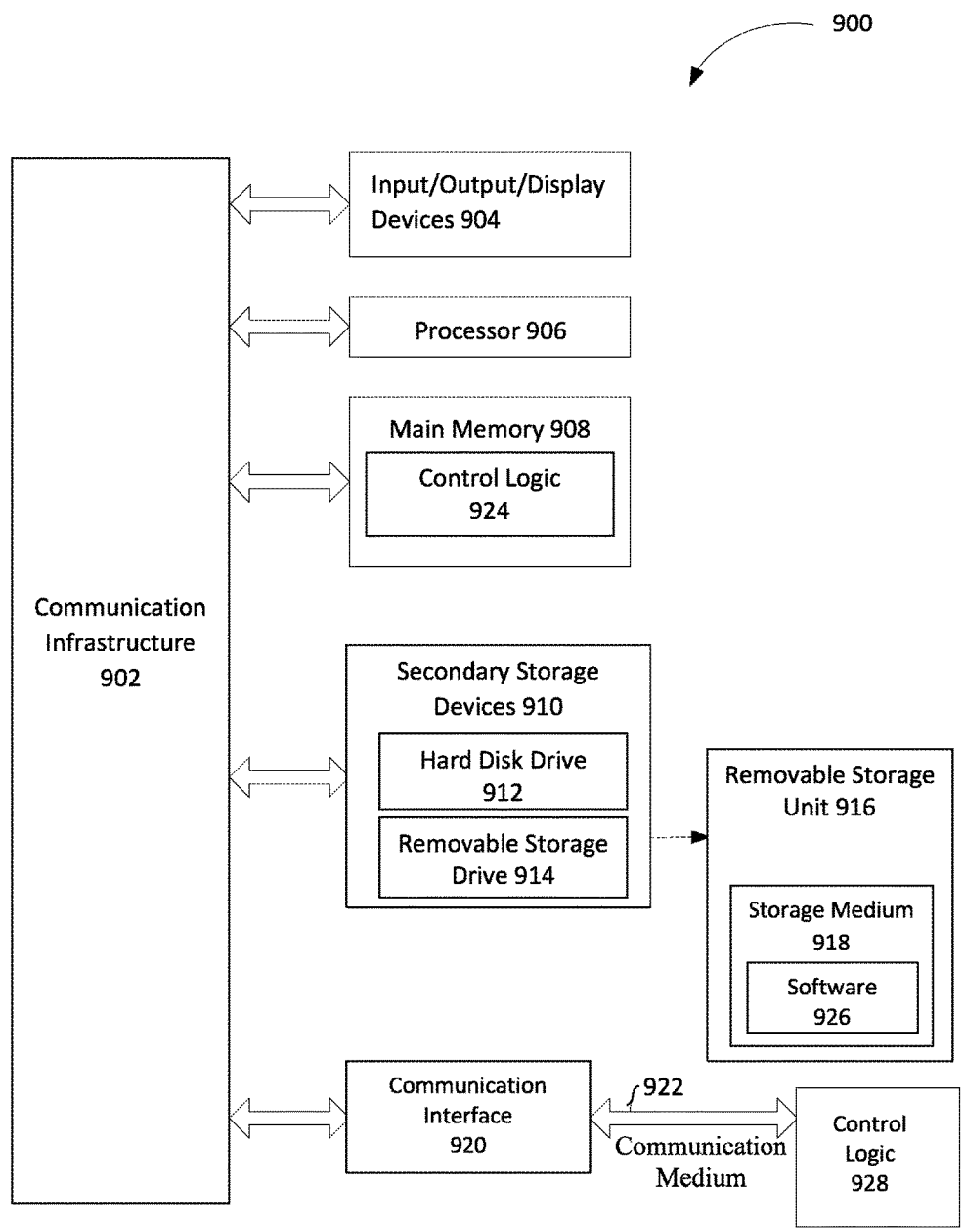
FIG. 9 is a block diagram of an example processor-based system that may be used to implement various embodiments described herein.

The embodiments described herein, including systems, methods/processes, and/or apparatuses, may be implemented using a processor-based computer system, such as system 900 shown in FIG. 9. For example, various components of remote control 100 and system 400 can each be implemented using one or more systems 900.

System 900 can be any commercially available and well known computer capable of performing the functions described herein, such as computers available from International Business Machines, Apple, Sun, HP, Dell, Cray, etc. System 900 may be any type of computer, including a desktop computer, a server, etc.

As shown in FIG. 9, system 900 includes one or more processors (also called central processing units, or CPUs), such as a processor 906. Processor 906 may be used to implement certain elements of remote control 100 and system 400, or any portion or combination thereof, for example, though the scope of the embodiments is not limited in this respect. Processor 906 is connected to a communication infrastructure 920, such as a communication bus. In some embodiments, processor 906 can simultaneously operate multiple computing threads.

System 900 also includes a primary or main memory 908, such as random access memory (RAM). Main memory 908 has stored therein control logic 924 (computer software), and data.

System 900 also includes one or more secondary storage devices 910. Secondary storage devices 910 may include, for example, a hard disk drive 912 and/or a removable storage device or drive 914, as well as other types of storage devices, such as memory cards and memory sticks. For instance, system 900 may include an industry standard interface, such a universal serial bus (USB) interface for interfacing with devices such as a memory stick. Removable storage drive 914 may represent a floppy disk drive, a magnetic tape drive, a compact disk drive, an optical storage device, tape backup, etc.

Removable storage drive 914 may interact with a removable storage unit 916. Removable storage unit 916 includes a computer useable or readable storage medium 918 having stored therein computer software 926 (control logic) and/or data. Removable storage unit 916 represents a floppy disk, magnetic tape, compact disc (CD), digital versatile disc (DVD), Blu-ray™ disc, optical storage disk, memory stick, memory card, or any other computer data storage device. Removable storage drive 914 reads from and/or writes to removable storage unit 916 in a well-known manner.

System 900 also includes input/output/display devices 904, such as monitors, keyboards, pointing devices, etc.

System 900 further includes a communication or network interface 920. Communication interface 920 enables system 900 to communicate with remote devices. For example, communication interface 920 allows system 900 to communicate over communication networks or mediums 922 (representing a form of a computer useable or readable medium), such as local area networks (LANs), wide area networks (WANs), the Internet, etc. Communication interface 920 may interface with remote sites or networks via wired or wireless connections. Examples of communication interface 922 include but are not limited to a modem, a network interface card (e.g., an Ethernet card), a communication port, a Personal Computer Memory Card International Association (PCMCIA) card, etc.

Control logic 928 may be transmitted to and from system 900 via the communication medium 922.

Any apparatus or manufacture comprising a computer useable or readable medium having control logic (software) stored therein is referred to herein as a computer program product or program storage device. This includes, but is not limited to, system 900, main memory 908, secondary storage devices 910, and removable storage unit 916. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for implementing the elements of the remote control 100 and system 400 and/or further embodiments described herein. Embodiments of the invention are directed to computer program products comprising such logic (e.g., in the form of program code, instructions, or software) stored on any computer useable medium. Such program code, when executed in one or more processors, causes a device to operate as described herein.

Note that such computer-readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

It is noted that while FIG. 9 shows a server/computer, persons skilled in the relevant art(s) would understand that embodiments/features described herein could also be implemented using other well-known processor-based computing devices, including but not limited to, smart phones, tablet computers, netbooks, gaming consoles, personal media players, and the like.

IV. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method for remotely controlling one or more devices and/or a user interface, the method comprising:
    detecting a user input event at a user input button of a plurality of user input buttons of a remote control, the user input button at which the user input event was detected comprising a metal dome, a printed circuit board, and a pair of electrodes disposed on the printed circuit board;
    determining that the user input event is a click event, a touch event, or another user input event, wherein determining that the user input event is the click event is based on detecting that the metal dome of the corresponding user input button has been depressed such that it shorts the pair of electrodes together;
    mapping a control command to the user input event based on whether the user input event is the click event or the touch event and on the user input button at which the user input event was detected; and
    for the user input button at which the user input event was detected, causing a first control command to be executed in response to determining that the user input event is the click event and causing a second control command to be executed in response to determining that the user input event is the touch event.

2. The method of claim 1, wherein detecting that the metal dome has been depressed such that it shorts the pair of electrodes together comprises detecting that a mutual capacitance between the pair of electrodes is substantially zero.

3. The method of claim 1, wherein the first and/or second control command is a command for remotely controlling a controlled device, the method further comprising executing the first and/or second control command at the controlled device.

4. The method of claim 1, wherein a unique control command is mapped to each user input button for each of at least the click event and the touch event.

5. The method of claim 1, wherein determining that the user input event is the click event or the touch event comprises:
    detecting a mutual capacitance on a sensor coupled to the user input button at which the user input event was detected.

6. The method of claim 5, further comprising:
    determining that the user input event is the touch event in response to determining that the mutual capacitance at the sensor falls between an upper threshold value and a lower threshold value.

7. The method of claim 1, wherein the first and/or second control command is a command to render a graphical user interface associated with the remote control on a screen of a device viewable by a user of the remote control, the graphical user interface displaying an image of the remote control and a plurality of control commands on the screen.

8. The method of claim 7, further comprising enabling the user to selectively map different control commands of the plurality of control commands to different user input events via the graphical user interface.

9. The method of claim 7, further comprising enabling the user to selectively map different control commands of the plurality of control commands to different user input buttons of the plurality of user input buttons via the graphical user interface.

10. The method of claim 7, wherein control commands of the plurality of control commands are executable through an interaction with the graphical user interface associated with the remote control displayed on the screen.

11. A remote control system for remotely controlling one or more devices and/or a user interface, the remote control system comprising:
    a remote control comprising:
        a plurality of user input buttons, each of the user input buttons configured to receive a user input event and comprising a metal dome, a printed circuit board, and a pair of electrodes disposed on the printed circuit board;
        a plurality of sensors, at least one sensor of the plurality of sensors being coupled to one user input button of the plurality of user input buttons, the sensors being configured to generate sensor data in response to a user input event being received at a corresponding user input button; and user input event detection logic configured to receive the sensor data and identify whether the user input event received at the corresponding user input button was a click event, a touch event, or another user input event, wherein the user input event detection logic identifies that the user input event is the click event based on receiving sensor data indicating that the metal dome of the corresponding user input button is depressed such that it shorts the pair of electrodes of the corresponding user input button; and command selection logic configured to cause a first control command to be executed in response to determining that the user input event received at the corresponding user input button was the click event and to cause a second control command to be executed in response to determining that the user input event received at the corresponding user input button was the touch event.

12. The remote control system of claim 11, wherein the command selection logic comprises part of the remote control.

13. The remote control system of claim 11, further comprising device control command execution logic, wherein the first and/or second control command is a command for remotely controlling a controlled device, and wherein the device control command execution logic causes the first and/or second control command to be executed at the controlled device.

14. The remote control system of claim 11, wherein a user input button of the plurality of user input buttons is a click pad having a plurality of sensors coupled thereto at corresponding sensor positions of the click pad, the click pad configured to receive a user input event at each of the sensor positions.

15. The remote control system of claim 14, wherein a different control command from a set of control commands is mapped to each of the sensor positions of the click pad for each of at least a click input event and a touch input event, wherein the set of control commands includes the first control command and the second control command.

16. The remote control system of claim 11, further comprising remote control graphical user interface logic, wherein the first and/or second control command is directed to a graphical user interface associated with the remote control and wherein the remote control graphical user interface logic causes the graphical user interface to be displayed on a screen of a device viewable by a user of the remote control, the graphical user interface displaying an image of the remote control and a plurality of control commands on the screen.

17. The remote control system of claim 16, further comprising remote control user customization logic, the remote control user customization logic being configured to enable the user to selectively map different control commands of the plurality of control commands to different user input events via the graphical user interface.

18. The remote control system of claim 16, further comprising remote control user customization logic, the remote control user customization logic being configured to enable the user to selectively map different control commands of the plurality of control commands to different user input buttons of the plurality of user input buttons via the graphical user interface.

19. The remote control system of claim 16, wherein control commands of the plurality of control commands are executable through interaction with the graphical user interface associated with the remote control displayed on the screen.

20. A remote control for remotely controlling one or more devices and/or a user interface, the remote control comprising:
  a plurality of user-actuatable components configured to receive a user input event, each user-actuatable component comprising:
    a printed circuit board;
    a first electrode formed on the printed circuit board;
    a second electrode formed on the printed circuit board;
    a metal dome formed on the printed circuit board and positioned between the first electrode and the second electrode; and
    a flexible overlay formed on the printed circuit board, the first electrode, the second electrode, and the metal dome;
  a click pad comprising:
    a plurality of third electrodes and a plurality of fourth electrodes, the third electrodes and the fourth electrodes being disposed alternately in rows and columns to form an array of third and fourth electrodes; and
  a plurality of sensing chips, each sensing chip configured to measure a mutual capacitance between a corresponding pair of the first electrodes and the second electrodes and between adjacent pairs of the third electrodes and the fourth electrodes, respectively, the sensing chips detecting a user input event at a corresponding pair of the first electrodes and the second electrodes and/or at a corresponding pair of the third electrodes and the fourth electrodes based on a drop in the mutual capacitance, the user input event comprising at least one of a click event or a touch event, the mutual capacitance falling between an upper threshold value and a lower threshold value in response to the touch event, and the metal dome shorting the corresponding first and second electrodes and/or the corresponding third and fourth electrodes together causing the mutual capacitance to approach zero in response to the click event.

* * * * *